United States Patent [19]

Lim

[11] Patent Number: 5,584,892
[45] Date of Patent: Dec. 17, 1996

[54] PROCESS FOR PRODUCING NICKEL ELECTRODE HAVING LIGHTWEIGHT SUBSTRATE

[75] Inventor: Hong S. Lim, Agoura Hills, Calif.

[73] Assignee: Hughes Aircraft Company, Los Angeles, Calif.

[21] Appl. No.: 470,551

[22] Filed: Jun. 6, 1995

[51] Int. Cl.⁶ .............................. H01M 4/04; H01M 4/52
[52] U.S. Cl. ........................ 29/623.5; 429/50; 429/223
[58] Field of Search ........................ 29/623.5; 429/223, 429/50

[56] References Cited

U.S. PATENT DOCUMENTS

| | | |
|---|---|---|
| 3,669,744 | 6/1972 | Tsenter et al. . |
| 4,000,350 | 12/1976 | Wittmann . |
| 4,250,235 | 2/1981 | DuPont et al. . |
| 4,262,061 | 4/1981 | Rogers . |
| 4,283,844 | 8/1981 | Milden et al. . |
| 4,820,597 | 4/1989 | Lim et al. . |
| 5,100,748 | 3/1992 | Doniat et al. ........................ 429/223 |
| 5,196,281 | 3/1993 | Pensabene et al. ................ 429/223 X |

Primary Examiner—John S. Maples
Attorney, Agent, or Firm—Elizabeth E. Leitereg; Terje Gudmestad; W. K. Denson-Low

[57] ABSTRACT

A nickel electrode having a lightweight porous nickel substrate is subjected to a formation cycle involving heavy overcharging and under-discharging in a KOH electrolyte having a concentration of 26% to 31%, resulting in electrodes displaying high active material utilization.

14 Claims, 2 Drawing Sheets

PROCESS FOR PRODUCING NICKEL ELECTRODE HAVING LIGHTWEIGHT SUBSTRATE

This invention is related to Government Contract No. NAS 3-22238, NASA-Lewis.

BACKGROUND OF THE INVENTION

This invention relates generally to nickel-hydrogen (Ni/$H_2$) storage batteries and, more particularly, to a process for producing nickel electrodes having desirable utilization characteristics.

Nickel-hydrogen batteries became a major workhorse for many spacecraft, especially in geosynchronous earth orbit, because of their high reliability and long calendar and cycle life. Mission duration of some satellites has been extended beyond fifteen years as the reliability of other components of the spacecraft improved.

The nickel-hydrogen cell includes a cell stack which is made of a series of active plate sets, each plate set having a nickel hydroxide/oxide positive electrode (termed a "nickel electrode"), a hydrogen negative electrode, a separator between the electrodes, and an electrolyte such as an aqueous solution of potassium hydroxide. The nickel electrode is manufactured by impregnating a porous nickel substrate with nickel hydroxide active material which is reversibly converted to nickel oxyhydroxide in the cell when it is charged. The cell stack is packaged within a pressure vessel in which hydrogen gas is evolved and consumed when the cell is charged and discharged. A nickel-hydrogen storage cell has an open circuit voltage of about 1.3 volts, and a number of the cells are usually connected in series to provide the voltage required by the spacecraft power system. The charge capacity of the power system is adjusted by the total area of electrode in the cell.

The battery is one of the major weight components of many devices such as spacecraft and many other electronic devices, especially as their power demand is being increased. The nickel electrode is the heaviest component of presently used nickel-hydrogen cells, accounting for about one-third or more of the cell weight. The weight of the sintered-type nickel substrate is approximately 60% of the weight of the nickel electrode. Therefore, use of a lightweight, high porosity nickel substrate for the nickel electrode is very attractive. For example, use of a 90% porous substrate which weighs only one-half of a presently used 80% porous substrate will reduce the nickel electrode weight substantially (approximately by 30%) if the active material is fully utilized. The higher the porosity, the lighter the substrate weight becomes. In general, however, the higher the porosity, the poorer the utilization of the active material becomes.

Therefore, a principal object of the present invention is to provide a manufacturing process for a nickel electrode using a high porosity, lightweight substrate with the maximum utilization of the active material.

Other objects and advantages of the present invention will become apparent from the following detailed disclosure and description.

SUMMARY OF THE INVENTION

The present invention provides an improved lightweight nickel electrode which can be used in nickel-hydrogen (Ni/$H_2$) cells as well as other alkaline nickel cells, such as nickel metal hydride (Ni/$MH_x$) and nickel cadmium (Ni/Cd) cells. The lightweight nickel electrodes of the present invention can be provided by means of a process which utilizes a modified formation cycle regime involving a partial discharge and a heavy overcharge. More particularly, the process of the present invention includes repetitively charging and discharging a nickel impregnated substrate in a formation cycle involving overcharging and under-discharging.

In a preferred embodiment, the nickel electrode is obtained by electrochemical impregnation of a nickel substrate having a porosity in the range of about 85% to 95% in an aqueous-alcoholic (approximately 50/50) or aqueous bath containing nickel nitrate and cobalt nitrate.

Nickel electrodes formed in accordance with the present invention can be used in various types of alkaline nickel cells requiring electrodes with improved specific energy characteristics.

BRIEF DESCRIPTION OF THE DRAWING

The various features and advantages of the present invention may be more readily understood with reference to the following detailed description taken in conjunction with the accompanying drawing figures wherein like reference numerals designate like structural elements and in which.

DETAILED DESCRIPTION

Figure 1:
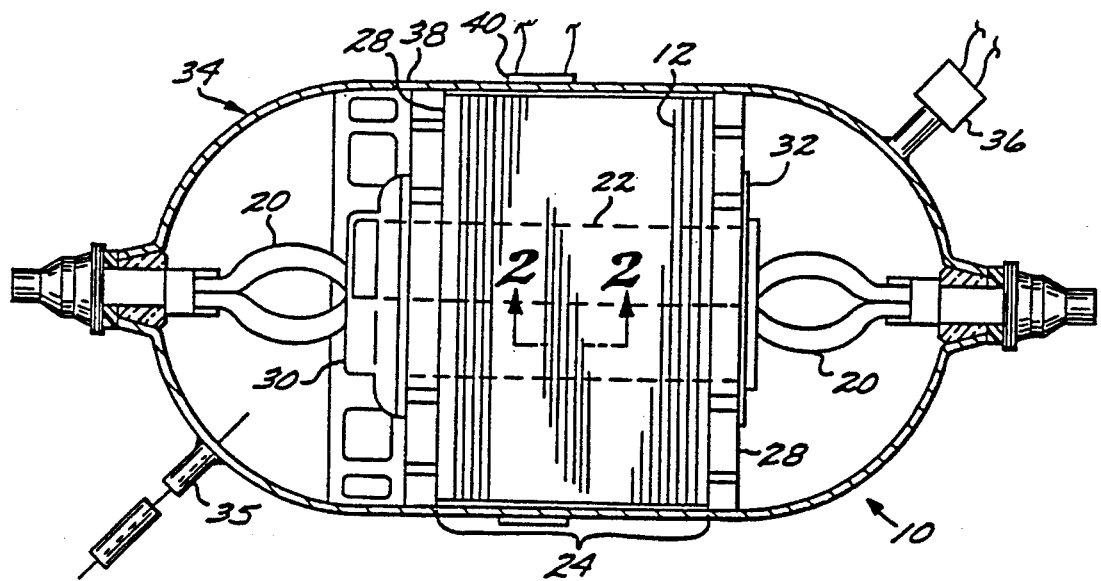
FIG. 1 is a sectional elevational view of a flight-type nickel-hydrogen cell.
Figure 2:
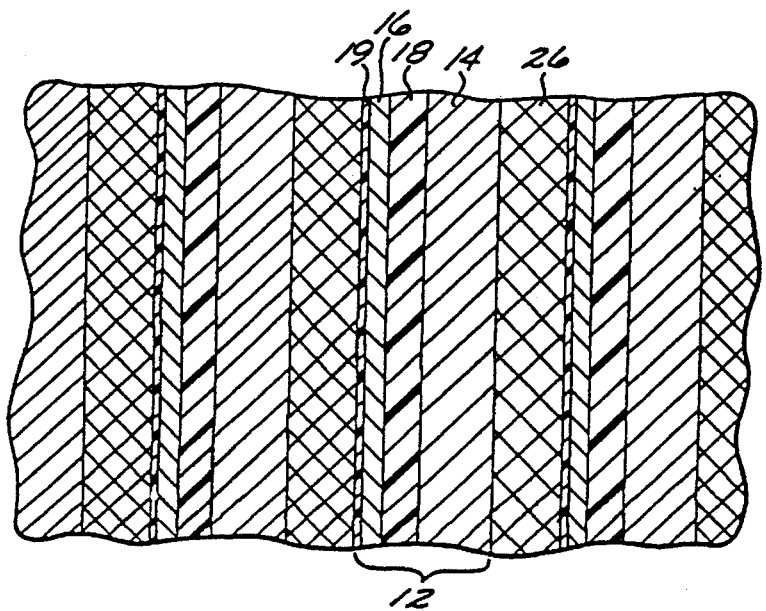
FIG. 2 is an enlarged sectional view of a detail of FIG. 1, taken generally on line 2—2, illustrating the plate sets.

The present invention is preferably used in conjunction with a nickel-hydrogen storage cell 10, as illustrated in FIGS. 1 and 2, which contains pressurized hydrogen gas. Such a cell 10 typically comprises a plurality of individual plate sets 12. Each plate set 12 in turn comprises a cathode or positive electrode 14, an anode or negative electrode 16, and an electrolyte-containing separator 18, which physically separates the electrodes 14 and 16, and also supplies the electrolyte medium through which ionic conduction takes place. Charging and discharging of the plate set 12 are accomplished through electrical leads 20.

Various constructions of nickel-hydrogen cells and components are disclosed in the following U.S. patents, whose disclosures are herein incorporated by reference: U.S. Pat. Nos. 4,820,597; 4,283,844; 4,262,061; 4,250,235; 4,000,350; and 3,669,744.

The positive or nickel electrode 14 is formed by impregnating nickel hydroxide into a porous sintered substrate, and the complete process will be discussed in greater detail subsequently. The negative or hydrogen electrode 16 is coated on one side by a sintered mixture of platinum black and polytetrafluoroethylene, and on the other side with a porous layer of polytetrafluoroethylene 19. These layers are applied to a nickel substrate in the form of an etched sheet or a woven mesh, to form the negative electrode 16. Many different types of separators 18 have been used, including, for example, asbestos, nylon, and a cloth of zirconium oxide-yttrium oxide. The electrolyte, typically a 20% to 31% aqueous solution of potassium hydroxide, is impregnated into the separator 18, the nickel electrode 14, and the hydrogen electrode 16 in this flight-type cell.

The individual plate sets 12 are assembled onto a central core 22 to form a stacked array 24. In forming the stacked array 24, a monofilament polypropylene screen 26 is placed between each plate set 12, so that hydrogen evolved at the negative electrode 16 during normal charging can diffuse away from the electrode 16, and oxygen liberated during overcharging at the nickel electrode 14 can diffuse away from the electrode 14 and to the negative electrode 16 to combine with hydrogen. The stacked array 24 is placed under a longitudinal compression of, for example, about 10–30 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer 32 against the compression plate 28 to hold the stacked array 24 in place.

The stacked array 24 is sealed within a pressure vessel 34, manufactured of a material such as Inconel 718 nickel-based alloy which can withstand internal pressures on the order of 1,000 psi, without damage by hydrogen embrittlement or corrosion by the electrolyte. A gas fill tube 35 allows gas content and pressure within the pressure vessel 34 to be controlled if necessary. The pressure vessel 34 is typically constructed in the form of a cylindrical tube having domed ends. By way of illustration, the cell 10 having the pressure vessel 34 of external dimensions 3½ inches diameter and 13 inches long can contain about 40 individual plate sets 12, with a resulting electrical storage capacity of the cell of about 50 ampere-hours. The cell capacity can be adjusted either by the number of plate sets 12 or by using various diameters of the cell stack components and pressure vessel 34. The cell 10 may be charged and discharged through thousands of cycles without apparent physical damage to the components, if the charging and discharging are accomplished properly. A number of cells 10 are typically combined in series arrangements to produce a battery with the required voltage characteristics.

Charging is accomplished by passing a DC current through the leads 20 so that current flows through stack array 24 from the electrode 14 to the electrode 16. Electrical energy is thereby stored in each plate set in the form of chemical energy for subsequent discharging to produce a usable current. For an illustration of an operating power system of a satellite, a nickel-hydrogen cell of the type described above may be fully charged by a solar cell array to a capacity of, for example, about 50 ampere-hours, using a current of about 5 amperes at 1.5 volts, through a charging period of about 14 hours from a discharged state. The voltage and charging time vary, depending upon the power available from the solar cell and the cycle dictated by the orbit of the spacecraft.

The cell is normally instrumented to monitor its operational state. As the nickel-hydrogen cell 10 is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be measured by minute deformation of the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34.

The electrode reaction of a nickel-hydrogen ($Ni/H_2$) cell can be illustrated as follows:

Positive Electrode:

$$2Ni(OH)_2 + 2OH^- = 2NiOOH + 2H_2O + 2e$$

Negative Electrode:

$$2H_2O + 2e = 2OH^- + H_2$$

The overall cell reaction is:

$$2Ni(OH)_2 = 2NiOOH + H_2$$

Overcharge or side reactions include:

Positive Electrode:

$$2OH^- = H_2O + \tfrac{1}{2}O_2 + 2e$$

Negative Electrode:

$$2H_2O + 2e = 2OH^- + H_2$$

Nickel electrodes used in $Ni/H_2$ cells generally utilize porous nickel substrates, preferably high porosity, lightweight nickel substrates. Such substrates are made of a mixed sintered mat of nickel fibers and nickel powder and may also contain cobalt powder, if desired. For example, a lightweight substrate may contain 45% nickel fibers and 55% nickel powder (45/55) or 45% nickel fibers, 45% nickel powder, and 10% cobalt powder (45/45/10). Such substrates can be impregnated electrolytically with nickel hydroxide with a small amount (about 10%) of cobalt hydroxide, using current densities in the range of 0.2 to 0.6 $A/in^2$, which depends on the substrate porosity and thickness.

A typical impregnation utilizes a solution containing 1.8M $Ni(NO_3)_2$ and 0.18M $Co(NO_3)_2$ in 45% ethanol at pH 3. Impregnation is carried out applying about 0.5 $A/in^2$ for 5.5 hours at about 76° C., with a target loading level of at least 1.7 g/cc for about 90% porous 1.5 mm thick sintered substrates. Following impregnation, the resulting electrode is rinsed with water and transferred to a formation tank for formation cycling.

Previously used formation cycle regimes generally involved over-discharging the electrodes in about 20% aqueous KOH electrolyte. For example, a typical formation cycle would consist of the following steps:

(1) discharging the electrode at 0.45 $A/in^2$ for 20 minutes, (2) charging the electrode at 0.45 $A/in^2$ for 40 minutes, (3) discharging the electrode at 0.45 $A/in^2$ for 40 minutes, (4) charging the electrode at 0.45 $A/in^2$ for 40 minutes, (5) repeating steps (3) and (4) eight times for a total of nine times, (6) discharging the electrode at 0.10 $A/in^2$ for 40 minutes, and (7) charging the electrode at 0.07 $A/in^2$ for 40 minutes.

One of the problems caused by using the previous formation cycle with highly porous, lightweight nickel substrates was that the electrodes demonstrated a relatively low utilization of the active material; for example, a utilization in the range of only 70% to 80% of the theoretical value was generally observed.

According to the present invention, the formation cycle regime involves a partial discharge and heavy overcharge of the electrode. A formation cycle regime according to the present invention includes the steps of:

(1) charging the electrode at about 0.12 C rate based on the theoretical capacity for 16 hours, (2) discharging the electrode at about 0.6 C rate for 60 minutes, (3) charging the electrode at about 0.6 C rate for 132 minutes, (4) discharging the electrode at about 0.6 C rate for 60 minutes, (5) charging the electrode at about 0.6 C rate for 132 minutes, (6) discharging the electrode at about 0.6 C rate for 60 minutes, (7) charging the electrode at about 0.6 C rate for 132 minutes, and (8) discharging the electrode at about 0.6 C rate for 60 minutes, where the rate C is defined as the rate of charge at which the cell is fully charged from a fully discharged state in one hour or vice versa.

Following the formation cycle regime described above, the electrodes were washed and dried in a vacuum oven at 70° C. for three to sixteen hours before use.

The nickel electrodes impregnated and formation-cycled according to the above-described method are characterized by improved specific energy and improved utilization of the active material of the electrode, compared to electrodes using the above-described previously used formation cycle regime.

The invention will be better understood by reference to the following examples which are intended to be illustrative and not unduly limiting to the scope of the present invention, which is defined in the claims appended hereto.

The following example illustrates the process of the present invention.

EXAMPLE 1

Nickel plaque substrates 1.5 mm thick of 88% porosity containing nickel fibers and nickel powder (45/55) were impregnated with nickel hydroxide active material as follows: The substrates were immersed in an aqueous alcoholic impregnation bath containing 40% by volume of alcohol and 1.7M nickel nitrate and 0.17M cobalt nitrate at pH 3. The plaques were subjected to a cathodic current of 0.5 A/in$^2$ at 76° C.

The impregnated plaques were then rinsed with water, transferred to a formation tank containing 26% aqueous KOH electrolyte and cycled four times as follows: First, they were charged at 0.045 A/in$^2$ for 16 hours and then discharged at 0.225 A/in$^2$ for 60 minutes (1 hour) to approximately 60% of the theoretical capacity. The theoretical capacity is defined as a hypothetical capacity of the electrode in which all nickel hydroxide is oxidized and reduced reversibly through a one-electron transfer per nickel hydroxide molecule. Then, in subsequent cycles, the impregnated plaques were charged at 0.225 A/in$^2$ for 132 minutes, giving an approximately 75% overcharge of the theoretical capacity, and then discharged at 0.225 A/in$^2$ for 60 minutes.

The following example illustrates the high active material utilization of electrodes prepared in accordance with the process of Example 1.

EXAMPLE 2

The active material utilization of electrodes prepared according to the process of Example 1 were then measured as follows. Following the formation cycle, the electrodes were washed and dried in a vacuum oven at 70° C. Substrate weight and thickness were measured before and after the impregnation/formation operation to determine the weight gain ("pick-up") and thickness changes by the impregnation. Active material loading level (g/cc-void) was calculated using the weight pick-up values and substrate porosity.

Figure 3:
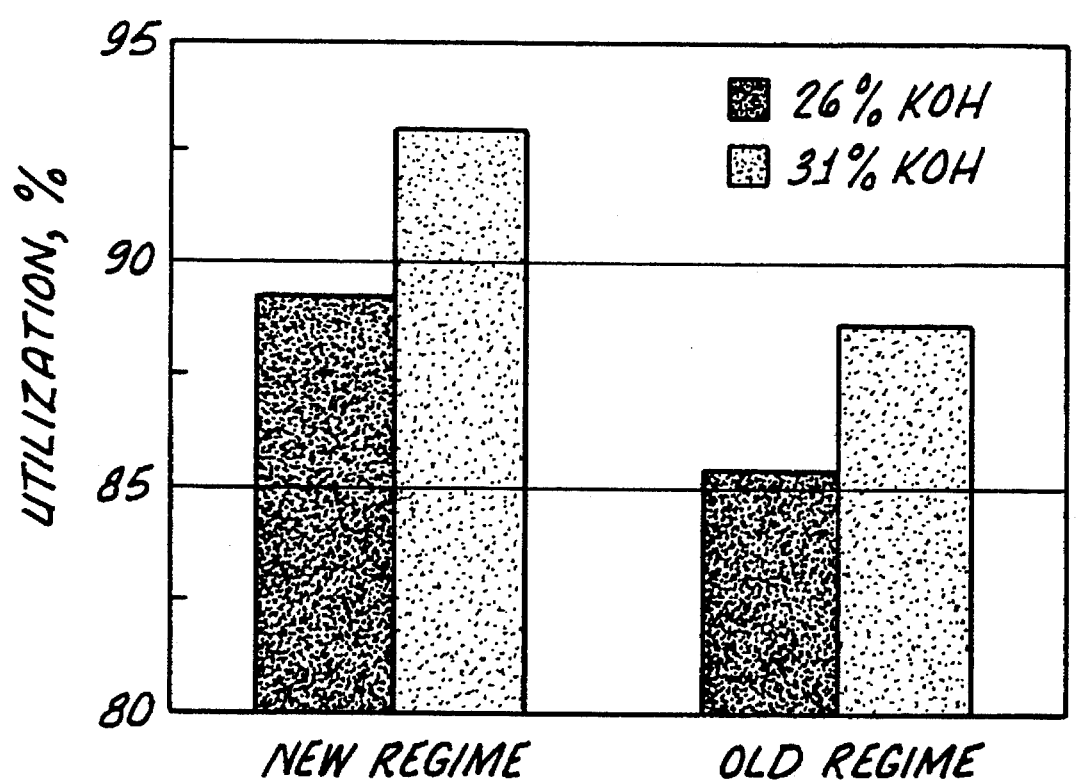
FIG. 3 is a graphical representation of the utilization percentages of nickel-hydrogen electrodes using the improved formation regime of the present invention (new regime) compared to the previously used standard formation regime (old regime).

Donut-shaped electrodes with outside diameter of 3.25 inches and inside diameter of 1.25 inches were punched out after drying. Electrode capacities were measured in 26% and 31% KOH electrolyte in an electrolyte flooded cell and rated at 2.3 Ah/electrode. The initial electrode capacities were measured after soaking in the 26% KOH electrolyte overnight using the following cycle regimes. Cells were charged at C/2 rate for 160 minutes followed by discharging the cell at C/2 to −1.0 V against a nickel sheet counter electrode. These capacity measurements were repeated for 5 cycles. Two additional capacities were measured in a similar regime but at 1.4 C rate instead of C/2 rate. The active material utilization was calculated using the average value of the measured capacity, and found to be 89.5%. In comparison, a nickel electrode subjected to the previously used formation cycle described above was found to have a utilization of only 85.7%, as shown in FIG. 3.

EXAMPLE 3

The procedure for measuring active material utilization described in Example 2 was followed, except that the electrolyte used was a 31% aqueous KOH electrolyte. Utilization was determined to be 93.3% compared to 88.9% for an electrode subjected to the formation cycling regime previously used as described above. These results are shown in FIG. 3.

Having thus described exemplary embodiments of the present invention, it will be understood by those skilled in the art that the within disclosures are exemplary only and that the present invention is only limited by the following claims.

What is claimed is:

1. A process for producing a nickel electrode characterized by high active material utilization which comprises subjecting a nickel hydroxide impregnated porous nickel substrate electrode to a formation cycle comprising repetitively overcharging and partially discharging said electrode within a battery cell before use of the nickel electrode in a working battery.

2. The process of claim 1 wherein said porous nickel substrate has a porosity in the range of about 85% to 95%.

3. The process of claim 1 wherein said formation cycle is carried out in an electrolyte comprising an aqueous solution of potassium hydroxide.

4. The process of claim 3 wherein said electrolyte is a 20% to 31% aqueous solution of potassium hydroxide.

5. The process of claim 3 wherein said electrolyte is a 26% aqueous solution of potassium hydroxide.

6. The process of claim 3 wherein said electrolyte is a 31% aqueous solution of potassium hydroxide.

7. The process of claim 1 wherein said formation cycle comprises the steps of:

(a) charging the electrode at about 0.12 C rate based on the theoretical capacity for 16 hours, (b) discharging the electrode at about 0.6 C rate based on the theoretical capacity for 60 minutes, (c) charging the electrode at about 0.6 C rate based on the theoretical capacity for 132 minutes, (d) discharging the electrode at about 0.6 C rate based on the theoretical capacity for 60 minutes, (e) charging the electrode at about 0.6 C rate based on the theoretical capacity for 132 minutes, (f) discharging the electrode at about 0.6 C rate based on the theoretical capacity for 60 minutes, (g) charging the electrode at about 0.6 C rate based on the theoretical capacity for 132 minutes, and (h) discharging the electrode at about 0.6 C rate based on the theoretical capacity for 60 minutes, wherein the rate C is defined as the rate of charge at which the cell is fully charged from a fully discharged state in one hour or vice versa.

8. The process of claim 1 wherein said nickel hydroxide impregnated porous nickel substrate electrode is produced by electrolytically impregnating a porous nickel substrate in a bath comprising nickel nitrate and cobalt nitrate.

9. The process of claim 8 wherein said bath is an aqueous bath.

10. The process of claim 8 wherein said bath is an aqueous-alcoholic bath.

11. The process of claim 8 wherein said bath is a solution of 1.8M $Ni(NO_3)_2$ and 0.18M $Co(NO_3)_2$ in 45% ethanol at pH 3 and a current density at about 0.2 $A/in^2$ to 0.6 $A/in^2$ is applied for about 5.5 hours at about 76° C.

12. The process of claim 1 wherein said nickel electrode is utilized in a nickel-hydrogen cell.

13. The process of claim 12 wherein said nickel electrode is utilized in a nickel-metal hydride cell.

14. The process of claim 12 wherein said nickel electrode is utilized in a nickel-cadmium cell.

* * * * *